(12) United States Patent
Lim et al.

(10) Patent No.: US 8,805,583 B2
(45) Date of Patent: Aug. 12, 2014

(54) ROBOT AND CONTROL METHOD THEREOF

(75) Inventors: Bok Man Lim, Seoul (KR); Kyung Shik Roh, Seongnam-si (KR); Woong Kwon, Seongnam-si (KR); Ju Suk Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 522 days.

(21) Appl. No.: 13/218,836

(22) Filed: Aug. 26, 2011

(65) Prior Publication Data

US 2012/0065778 A1  Mar. 15, 2012

(30) Foreign Application Priority Data

Sep. 9, 2010 (KR) .................... 10-2010-0088337

(51) Int. Cl.
*G05B 19/04* (2006.01)
*G05B 19/18* (2006.01)

(52) U.S. Cl.
USPC ............ 700/254; 700/261; 700/61; 700/250; 700/253; 700/255; 700/259; 700/28; 345/474; 702/142

(58) Field of Classification Search
USPC .......... 700/254, 261, 61, 250, 253, 255, 259, 700/28; 345/474; 702/142, 150
See application file for complete search history.

(56) References Cited

U.S. PATENT DOCUMENTS

| 5,179,525 | A | * | 1/1993 | Griffis et al. ................ 703/1 |
| 5,355,064 | A | | 10/1994 | Yoshino et al. |
| 8,417,382 | B2 | * | 4/2013 | Yoshiike et al. ............ 700/253 |
| 2005/0113973 | A1 | * | 5/2005 | Endo et al. ................ 700/245 |
| 2006/0195409 | A1 | * | 8/2006 | Sabe et al. ................. 706/16 |
| 2006/0293791 | A1 | * | 12/2006 | Dariush ..................... 700/245 |
| 2007/0016329 | A1 | * | 1/2007 | Herr et al. ................. 700/250 |
| 2007/0073442 | A1 | * | 3/2007 | Aghili ....................... 700/245 |
| 2007/0255454 | A1 | * | 11/2007 | Dariush ..................... 700/245 |
| 2010/0042256 | A1 | * | 2/2010 | Takenaka et al. .......... 700/245 |
| 2011/0022232 | A1 | * | 1/2011 | Yoshiike et al. ........... 700/260 |
| 2011/0082566 | A1 | * | 4/2011 | Herr et al. ................. 623/24 |

FOREIGN PATENT DOCUMENTS

EP  1721711 A1  11/2006

OTHER PUBLICATIONS

European Search Report dated Dec. 5, 2011 issued in corresponding European Patent Application No. 11180042.1.

* cited by examiner

*Primary Examiner* — Ronnie Mancho
(74) *Attorney, Agent, or Firm* — Staas & Halsey LLP

(57) ABSTRACT

A robot, which performs natural walking similar to a human with high energy efficiency through optimization of actuated dynamic walking, and a control method thereof. The robot includes an input unit to which a walking command of the robot is input, and a control unit to control walking of the robot by calculating torque input values through control variables, obtaining a resultant motion of the robot through calculation of forward dynamics using the torque input values, and minimizing a value of an objective function set to consist of the sum total of a plurality of performance indices through adjustment of the control variables.

23 Claims, 8 Drawing Sheets

ROBOT AND CONTROL METHOD THEREOF

CROSS-REFERENCE TO RELATED APPLICATION

This application claims the benefit of Korean Patent Application No. 2010-0088337, filed on Sep. 9, 2010 in the Korean Intellectual Property Office, the disclosure of which is incorporated herein by reference.

BACKGROUND

1. Field

Embodiments relate to a robot, which walks based on actuated dynamic walking, and a control method thereof.

2. Description of the Related Art

Recently, research and development of walking robots which have a similar joint system to that of humans and are designed to coexist with humans in human working and living spaces has made rapid advance. Such walking robots include multi-leg walking robots having a plurality of legs, such as bipedal or tripedal walking robots, and in order to achieve stable walking of the robots, actuators, such as electric actuators and hydraulic actuators, located at respective joints, need to be driven. Driving of actuators is generally divided into a position-based Zero Moment Point (ZMP) control method in which command angles, i.e., command positions, of respective joints are given and the joints are controlled so as to trace the command angles, and a torque-based Finite State Machine (FSM) control method in which command torques of respective joints are given and the joints are controlled so as to trace the command torques.

In the ZMP control method, a walking direction, a walking stride, and a walking velocity of a robot are set in advance so as to satisfy a ZMP constraint, i.e., a condition that a ZMP is present in a safety region within a support polygon formed by (a) supporting leg(s) (if the robot is supported by one leg, this means the region of the leg, and if the robot is supported by two legs, this means a region set to have a small area within a convex polygon including the regions of the two legs in consideration of safety), walking patterns of the respective legs corresponding to the set factors are created, and walking trajectories of the respective legs are calculated based on the walking patterns. Further, angles of joints of the respective legs are calculated through inverse kinematic calculation of the calculated walking trajectories, and target control values of the respective joints are calculated based on current angles and target angles of the respective joints. Further, servo control in which the respective legs trace the calculated walking trajectories per control time is achieved. That is, during walking, whether or not positions of the respective legs precisely trace the walking trajectories according to the walking patterns is detected, and if some legs deviate from the walking trajectories, torques of actuators are adjusted so that the respective legs precisely trace the walking trajectories. The ZMP control method is a position-based control method and thus achieves precise position control, but performs precise angle control of the respective joints in order to control the ZMP and thus requires a high servo gain. Thereby, the ZMP control method requires high current and thus has low energy efficiency and high stiffness of the joints.

On the other hand, in the FSM control method, instead of tracing positions per control time, a finite number of operating states of a robot is defined in advance, target torques of respective joints are calculated with reference to the respective operating states during walking, and the joints are controlled so as to trace the target torques. Such an FSM control method controls torques of the respective joints during walking and thus enables a low servo gain, thereby achieving high energy efficiency and low stiffness. Further, the FSM control method does not need to avoid kinematic singularities, thereby allowing the robot to have a more natural gait with knees extended straight similar to that of a human.

Actuated dynamic walking employs torque-based control instead of position-based control, thereby having high energy efficiency and allowing a robot to have a more natural gait similar to that of a human. However, actuated dynamic walking cannot achieve precise position control and thus causes a difficulty in precisely controlling a stride or a walking velocity. Further, in actuated dynamic walking, a walking pattern is planed directly on a joint space differently from position-based control, thus causing a difficulty in forming a walking pattern having desired stride, walking velocity, and walking direction.

SUMMARY

Therefore, it is an aspect of an embodiment to provide a robot, which performs natural walking similar to a human with high energy efficiency through optimization of actuated dynamic walking, and a control method thereof.

Additional aspects of embodiments will be set forth in part in the description which follows and, in part, will be obvious from the description, or may be learned by practice of the embodiments.

In accordance with an aspect of an embodiment, a walking control method of a robot includes setting a plurality of variables to determine target joint routes and control gains as control variables, calculating torque input values based on the control variables, obtaining a resultant motion through calculation of forward dynamics using the torque input values, setting an objective function consisting of the sum total of a plurality of performance indices, and minimizing a value of the objective function through adjustment of the control variables.

The plurality of variables to determine the target joint routes may include a variable indicating left and right movement of hip joints of the robot, a variable indicating an inclination of a torso of the robot, a variable indicating a length of a stride of the robot, a variable indicating a bending angle of knees of the robot, a variable indicating a walking velocity of the robot, a variable indicating movement of ankles of the robot in the y-axis direction, a variable indicating an initial state of the left and right movement of the hip joints of the robot, and a variable indicating an initial state of the stride of the robot.

The control gains may include a position gain and a damping gain.

The target joint routes may be determined by setting a plurality of poses, selected from among poses assumed by the robot during walking of the robot in a half cycle, as reference poses and carrying out interpolation of angles of respective joints of the robot in the plurality of reference poses.

The walking of the robot in the half cycle may mean that the robot makes one step with its one foot.

The target joint routes may be overall routes of the respective joints obtained through symmetry in swing of left and right feet of the robot and periodicity in walking of the robot based on target joint routes of the respective joints determined during walking of the robot in the half cycle.

The reference poses may include a pose when the walking of the robot in the half cycle is started, a pose when the walking of the robot in the half cycle is completed, and a pose halfway between the point of time when the walking of the robot in the half cycle is started and the point of time when the walking of the robot in the half cycle is completed.

The joints may include a torso joint, hip joints, knee joints, and ankle joints.

In the setting of the objective function, the objective function may consist of the sum total of a performance index indicating a position error of a foot of the robot contacting the ground, a performance index indicating a force error transmitted to the foot of the robot at the point of time when the foot of the robot contacts the ground and a periodicity error of walking of the robot, a performance index indicating a walking velocity error of the robot, a performance index to minimize torques required during walking of the robot, and a performance index to minimize a walking style error generated when a current walking style is compared with a predetermined walking style.

In accordance with another aspect of an embodiment, a robot includes an input unit to which a walking command of the robot is input, and a control unit to control walking of the robot by calculating torque input values through control variables, obtaining a resultant motion of the robot through calculation of forward dynamics using the torque input values, and minimizing a value of an objective function set to consist of the sum total of a plurality of performance indices through adjustment of the control variables.

The control variables may include a plurality of variables to determine target joint routes of the robot and control gains.

The plurality of variables to determine the target joint routes may include a variable indicating left and right movement of hip joints of the robot, a variable indicating an inclination of a torso of the robot, a variable indicating a length of a stride of the robot, a variable indicating a bending angle of knees of the robot, a variable indicating a walking velocity of the robot, a variable indicating movement of ankles of the robot in the y-axis direction, a variable indicating an initial state of the left and right movement of the hip joints of the robot, and a variable indicating an initial state of the stride of the robot.

The control gains may include a position gain and a damping gain.

The target joint routes may be determined by setting a plurality of poses, selected from among poses assumed by the robot during walking of the robot in a half cycle, as reference poses and carrying out interpolation of angles of respective joints of the robot in the plurality of reference poses.

The walking of the robot in the half cycle may mean that the robot makes one step with its one foot.

The target joint routes may be overall routes of the respective joints obtained through symmetry in swing of left and right feet of the robot and periodicity in walking of the robot based on target joint routes of the respective joints determined during walking of the robot in the half cycle.

The reference poses may include a pose when the walking of the robot in the half cycle is started, a pose when the walking of the robot in the half cycle is completed, and a pose halfway between the point of time when the walking of the robot in the half cycle is started and the point of time when the walking of the robot in the half cycle is completed.

The joints may include a torso joint, hip joints, knee joints, and ankle joints.

The objective function may consist of the sum total of a performance index indicating a position error of a foot of the robot contacting the ground, a performance index indicating a force error transmitted to the foot of the robot at the point of time when the foot of the robot contacts the ground and a periodicity error of walking of the robot, a performance index indicating a walking velocity error of the robot, a performance index to minimize torques required during walking of the robot, and a performance index to minimize a walking style error generated when a current walking style is compared with a predetermined walking style.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
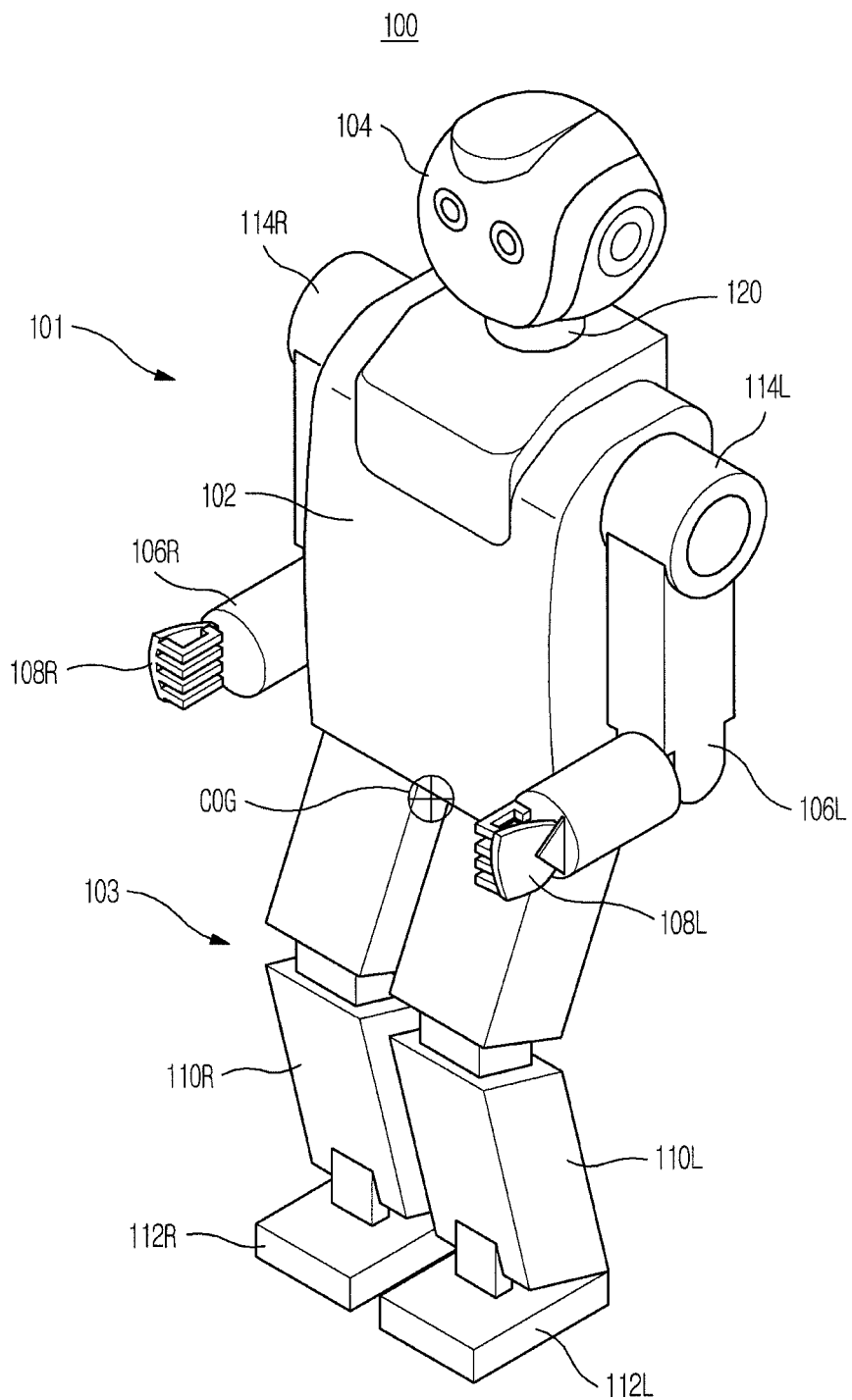
FIG. 1 is a view illustrating an external appearance of a robot in accordance with an embodiment.

Reference will now be made in detail to embodiments, examples of which are illustrated in the accompanying drawings, wherein like reference numerals refer to like elements throughout.

Hereinafter, among multi-leg walking robots, a bipedal walking robot will be exemplarily described.

FIG. 1 is a view illustrating an external appearance of a robot in accordance with an embodiment.

As shown in FIG. 1, a robot 100 in accordance with an embodiment is a bipedal walking robot, which walks upright using two legs 110 in the same manner as a human, and includes an upper body 101 including a torso 102, a head 104, and arms 106, and a lower body 103 including the two legs 110.

The upper body 101 of the robot 100 includes the torso 102, the head 104 connected to the upper portion of the torso 102 through a neck 120, the two arms 106L and 106R connected to both sides of the upper portion of the torso 102 through shoulders 114L and 114R, and hands 108L and 108R respectively connected to tips of the two arms 106L and 106R.

The lower body 103 of the robot 100 includes the two legs 110L and 110R connected to both sides of the lower portion of the torso 102 of the upper body 101, and feet 112L and 112R respectively connected to tips of the two legs 110L and 110R.

Here, "R" and "L" respectively indicate the right and left sides of the robot 100, and COG indicates the center of gravity of the robot 100.

Figure 2:
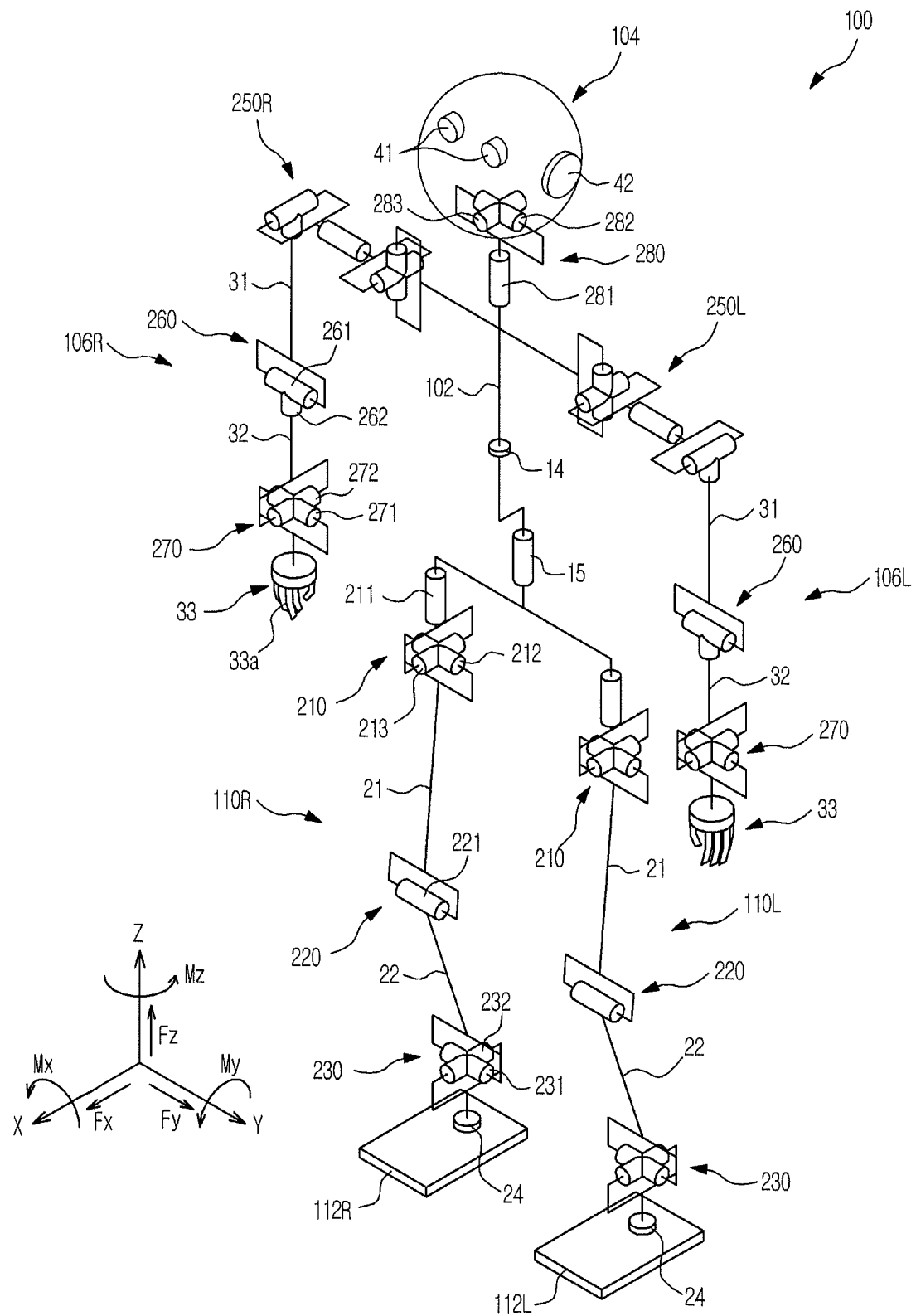
FIG. 2 is a view illustrating structures of main joints of the robot of FIG. 1.

FIG. 2 is a view illustrating structures of main joints of the robot of FIG. 1.

As shown in FIG. 2, a pose sensor 14 is installed on the torso 102 of the robot 100. The pose sensor 14 detects a tilt angle of the upper body 101, i.e., an inclination of the upper body 101 with respect to a vertical axis, and an angular velocity thereof, and then generates pose data. The pose sensor 14 may be installed on the head 104 as well as the torso 102.

A waist joint unit 15 having 1 degree of freedom in the yaw direction so as to rotate the upper body 101 is installed on the torso 102.

Further, cameras 41 to capture surrounding images and microphones 42 to input user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis), and a rotary joint 283 in the roll direction (rotated around the X-axis), and thus has 3 degrees of freedom.

Motors (for example, actuators, such as electric motors or hydraulic motors) to rotate the head 104 are connected to the respective rotary joints 281, 282, and 283 of the neck joint unit 280.

The two arms 106L and 106R of the robot 100 respectively include upper arm links 31, lower arm links 32, and the hands 108L and 108R.

The upper arm links 31 are connected to the upper body 101 through shoulder joint units 250L and 250R, the upper arm links 31 and the lower arm links 32 are connected to each other through elbow joint units 260, and the lower arm links 32 and the hands 108L and 108R are connected to each other by wrist joint units 270.

The shoulder joint units 250L and 250R are installed at both sides of the torso 102 of the upper body 101, and connect the two arms 106L and 106R to the torso 102 of the upper body 101.

Each elbow joint unit 260 has a rotary joint 261 in the pitch direction and a rotary joint 262 in the yaw direction, and thus has 2 degrees of freedom.

Each wrist joint unit 270 has a rotary joint 271 in the pitch direction and a rotary joint 272 in the roll direction, and thus has 2 degrees of freedom.

Each hand 108L or 108R is provided with five fingers 33a. A plurality of joints (not shown) driven by motors may be installed on the respective fingers 33a. The fingers 33a perform various motions, such as gripping of an article or pointing in a specific direction, in connection with movement of the arms 106.

The two legs 110L and 110R of the robot 100 respectively include thigh links 21, calf links 22, and the feet 112L and 112R.

The thigh links 21 correspond to thighs of a human and are connected to the torso 102 of the upper body 101 through hip joint units 210, the thigh links 21 and the calf links 22 are connected to each other by knee joint units 220, and the calf links 22 and the feet 112L and 112R are connected to each other by ankle joint units 230.

Each hip joint unit 210 has a rotary joint (hip yaw joint) 211 in the yaw direction (rotated around the Z-axis), a rotary joint (hip pitch joint) 212 in the pitch direction (rotated around the Y-axis), and a rotary joint (hip roll joint) 213 in the roll direction (rotated around the X-axis), and thus has 3 degrees of freedom.

Each knee joint unit 220 has a rotary joint 221 in the pitch direction, and thus has 1 degree of freedom.

Each ankle joint unit 230 has a rotary joint 231 in the pitch direction and a rotary joint 232 in the roll direction, and thus has 2 degrees of freedom.

Since six rotary joints of the hip joint unit 210, the knee joint unit 220, and the ankle joint unit 230 are provided on each of the two legs 110L and 110R, a total of twelve rotary joints is provided to the two legs 110L and 110R.

Further, multi-axis force and torque (F/T) sensors 24 are respectively installed between the feet 112L and 112R and the ankle joint units 230 of the two legs 110L and 110R. The multi-axis F/T sensors 24 measure three-directional components Fx, Fy, and Fz of force and three-directional components Mx, My, and Mz of moment transmitted from the feet 112L and 112R, thereby detecting whether or not the feet 112L and 112R touch the ground and load applied to the feet 112L and 112R.

Although not shown in the drawings, actuators, such as motors, to drive the respective rotary joints are installed on the robot 100. A control unit to control the overall operation of the robot 100 properly controls the motors, thereby allowing the robot 100 to perform various actions.

Figure 3:
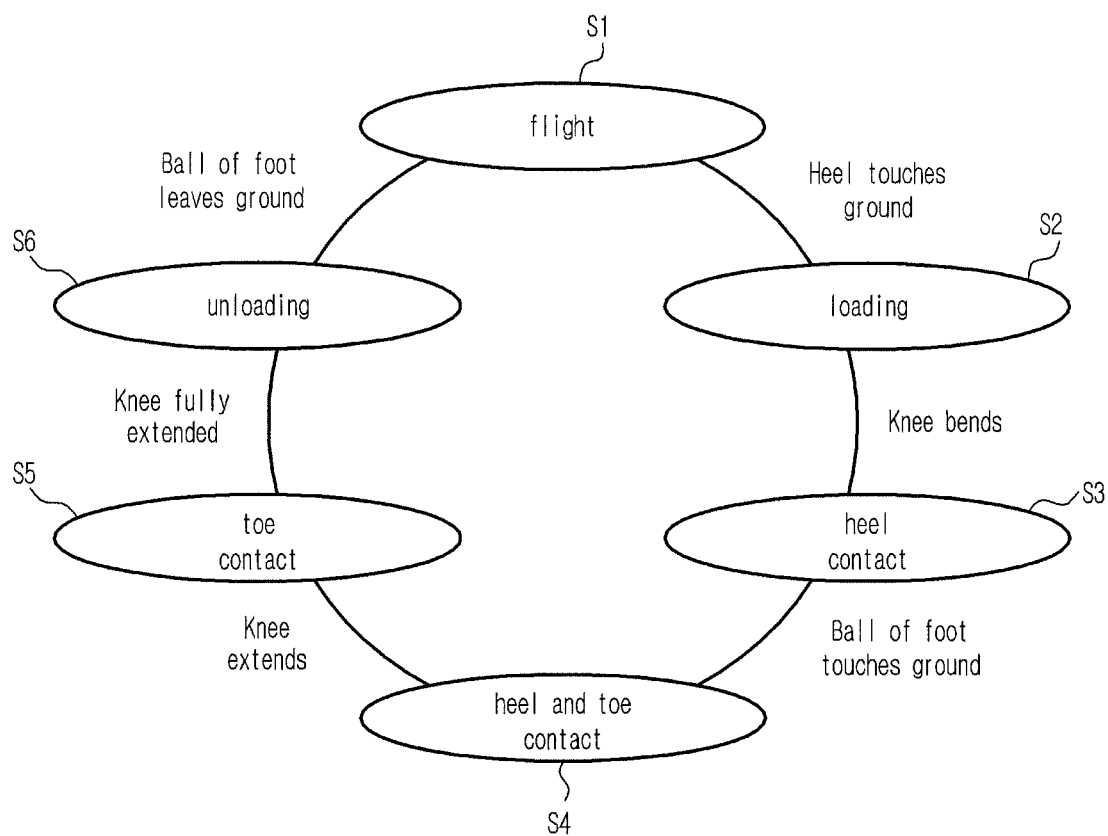
FIG. 3 is a view illustrating operating states of the robot and control actions of the respective operating states, while the robot in accordance with an embodiment walks based on an FSM.

FIG. 3 is a view illustrating operating states of the robot and control actions of the respective operating states, while the robot in accordance with an embodiment walks based on an FSM.

With reference to FIG. 3, in the torque-based FSM control method, operation of the robot 100 is divided into a plurality of operating states (for example, 6 states—S1, S2, S3, S4, S5, and S6), which are defined in advance. The respective operating states S1, S2, S3, S4, S5, and S6 indicate poses of one leg 110L or 110R of the robot 100 during walking, and stable walking of the robot 100 is achieved by proper transition between such poses of the robot 100.

The first operating state (flight state) S1 corresponds to a pose of swinging the leg 110L or 110R, the second operating state (loading state) S2 corresponds to a pose of loading the foot 112 on the ground, the third operating state (heel contact state) S3 corresponds to a pose of bringing the heel of the foot 112 into contact with the ground, the fourth operating state (heel and toe contact state) S4 corresponds to a pose of bringing both the heel and the toe of the foot 112 into contact with the ground, the fifth operating state (toe contact state) S5 corresponds to a pose of bringing the toe of the foot 112 into contact with the ground, and the sixth operating state (unloading state) S6 corresponds to a pose of unloading the foot 112 from the ground.

In order to transition from one operating state to another operating state, a control action to achieve such transition is required.

In more detail, if the first operating state S1 transitions to the second operating state S2 (S1→S2), a control action in which the heel of the foot 112 touches the ground is required.

If the second operating state S2 transitions to the third operating state S3 (S2→S3), a control action in which the knee (particularly, the knee joint unit) of the foot 112 touching the ground bends is required.

If the third operating state S3 transitions to the fourth operating state S4 (S3→S4), a control action in which the toe of the foot 112 touches the ground is required.

If the fourth operating state S4 transitions to the fifth operating state S5 (S4→S5), a control action in which the knee of the foot 112 touching the ground extends is required.

If the fifth operating state S5 transitions to the sixth operating state S6 (S4→S5), a control action in which the knee of the foot 112 touching the ground fully extends is required.

If the sixth operating state S6 transitions to the first operating state S1 (S6→S1), a control action in which the toe of the foot 112 leaves the ground is required.

Therefore, in order to perform the control actions, the robot 100 calculates torque commands of the respective joints corresponding to the respective control actions, and outputs the calculated torque commands to the actuators, such as the motors, installed on the respective joints to drive the actuators.

In such a torque-based FSM control method, walking of the robot 100 is controlled depending on the operating states S1, S2, S3, S4, S5, and S6, defined in advance.

Figure 4:
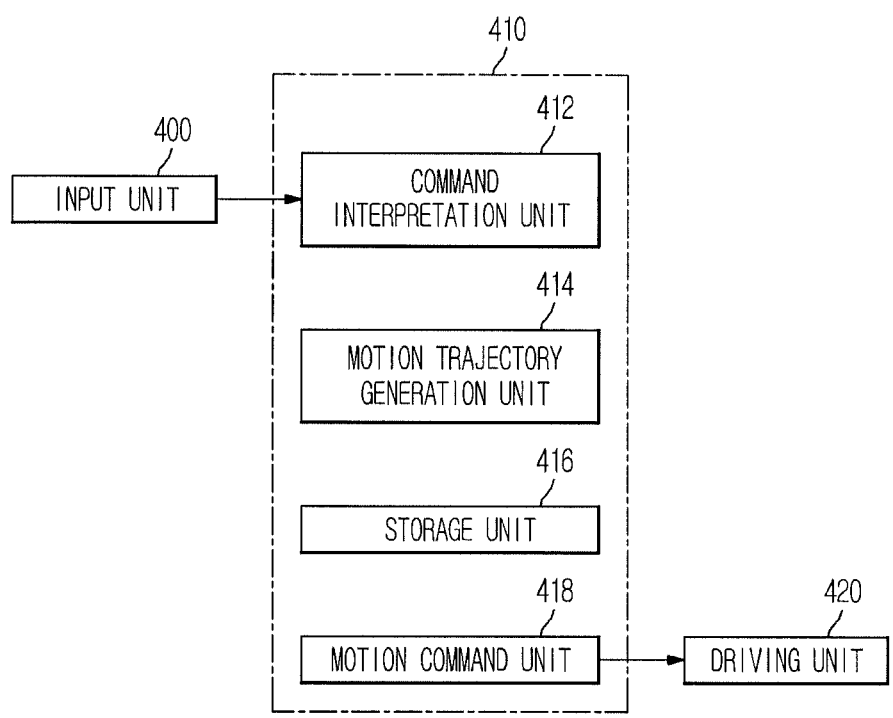
FIG. 4 is a walking control block diagram of the robot in accordance with an embodiment.

FIG. 4 is a walking control block diagram of the robot in accordance with an embodiment.

As shown in FIG. 4, the robot 100 includes an input unit 400 through which a user inputs a walking command, etc., a control unit 410 to perform overall control of the robot 100 according to the action command input through the input unit 400, and driving units 420 to drive respective joints of the robot 100 according to a control signal from the control unit 410.

The control unit 410 includes a command interpretation unit 412, a motion trajectory generation unit 414, a storage unit 416, and a motion command unit 418.

The command interpretation unit 412 interprets the action command input through the input unit 400, and recognizes robot parts which perform a main motion having high relevance to the commanded action and robot parts which perform remaining motions having low relevance to the commanded action, respectively.

The motion trajectory generation unit 414 generates optimized motion trajectories as to the robot parts performing the main motion among the robot parts recognized by the command interpretation unit 412 through optimization in consideration of robot dynamics, and generates predetermined motion trajectories as to the robot parts performing the remaining motions so as to correspond to the commanded action. Here, each motion trajectory is one of joint trajectories, link trajectories, and end-effecter (for example, finger tip or toe tip) trajectories.

The storage unit 416 divisionally stores the robot parts performing the main motion having high relevance to the commanded action and the robot parts performing the remaining motions having low relevance to the commanded action according to respective action commands, and stores predetermined motion trajectories so as to correspond to the commanded action according to the respective action commands.

The motion command unit 418 outputs a motion command, causing the robot parts performing the main motion to move along the optimized motion trajectories generated by the motion trajectory generation unit 141, to the corresponding driving units 420 and thus controls operation of the driving units 420, and outputs a motion command, causing the robot parts performing the remaining motions to move along the predetermined motion trajectories corresponding to the commanded action generated by the motion trajectory generation unit 141, to the corresponding driving units 420 and thus controls operation of the driving units 420.

Hereinafter, an optimization process of walking of a robot in accordance with an embodiment will be described in detail.

The control unit 410 sets control gains and a plurality of variables, which determine routes of target joints to be controlled during walking of the robot, as optimization variables.

When all of numerous control variables of the respective joints relating to walking are set as the optimization variable, complexity is increased and thus optimization time and a rate of convergence are lowered.

The minimum number of control variables to determine target joint routes may be set using periodicity in walking and symmetry in swing of legs. The control variables to determine the target joint routes in accordance with this embodiment include a variable (P1=q_hip_roll) indicating left and right movement of the hip joints of the robot, a variable (P2=q_torso) indicating an inclination of the torso of the robot, a variable (P3=q_hipsweep) indicating a length of a stride of the robot, a variable (P4=q_kneebend) indicating a bending angle of the knees of the robot, a variable (P5=tf) indicating a walking velocity of the robot, a variable (P6=q_ankle) indicating movement of the ankles of the robot in the y-axis direction, a variable (P7=q_hip_roll_ini) indicating an initial state of the left and right movement of the hip joints of the robot, and a variable (P8=q_hipsweep-ini) indicating an initial state of the stride of the robot. The variables P7 and P8 are control variables indicating an initial walking pose of the robot. The above-described control variables except for the variable P5 indicating the walking velocity are expressed in angles in the directions of corresponding degrees of freedom of corresponding joints. Although this embodiment describes eight variables to determine the target joint routes, the number of the variables is not limited thereto. Further, the contents of the variables are not limited thereto.

The control unit 410 calculates torque input values by parameterizing Expression to calculate the torque input values using the set optimization variables.

$$\tau^i = k_p^i(q_d^i - q^i) - k_d^i \bar{q}^i \quad \text{[Expression 1]}$$

Figure 5A:
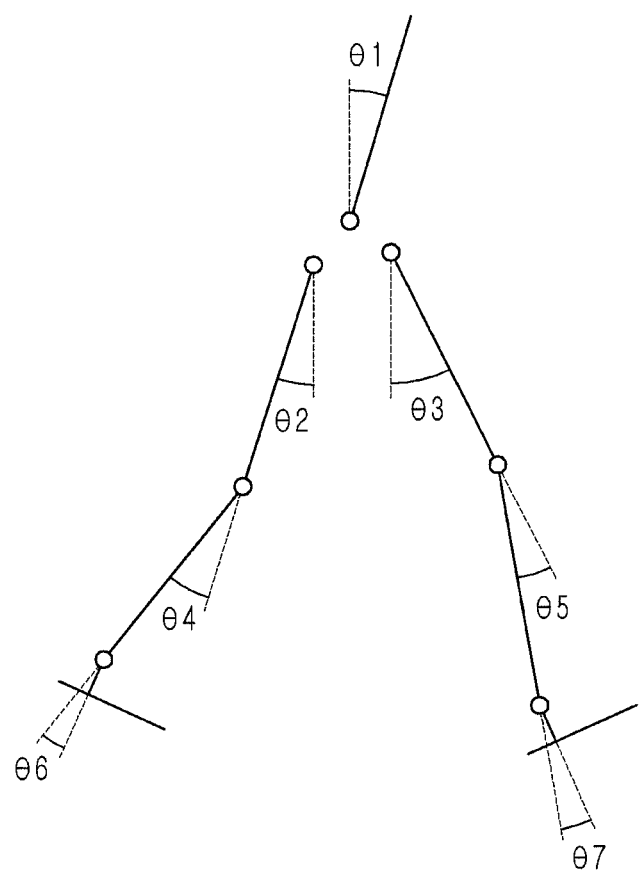
FIG. 5A is a conceptual view illustrating movement of joints of the robot in accordance with an embodiment in the y-axis direction.
Figure 5B:
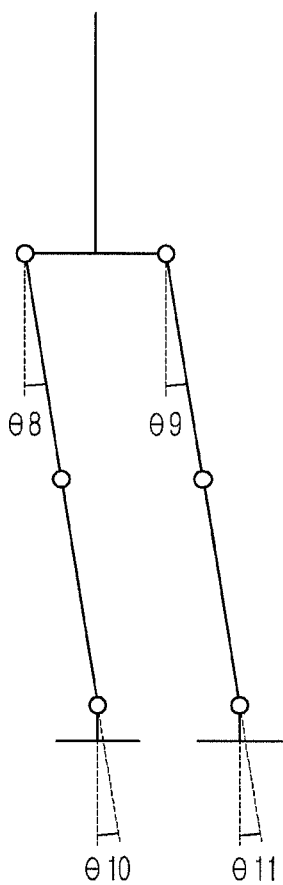
FIG. 5B is a conceptual view illustrating movement of the joints of the robot in accordance with an embodiment in the x-axis direction.

Herein, τ represents a torque input value, and i means each of joints relating to walking, i.e., including a torso joint movable at an angle of θ1 (of FIG. 5A) in the y-axis direction, left and right hip joints movable at angles of θ2 and θ3 (of FIG. 5A) and θ8 and θ9 (of FIG. 5B) in the y-axis direction and the x-axis direction, left and right knee joints movable at angles of θ4 and θ5 (of FIG. 5A) in the y-axis direction, and left and right ankle joints movable at angles of θ6 and θ7 (of FIG. 5A) and θ10 and θ11 (of FIG. 5B) in the y-axis direction and the x-axis direction.

Further, kp represents a position gain, and kd represent a damping gain. qd represents a target joint route, q represents a current angle measured by an encoder, and q̄ represents an angular velocity.

The control unit 410 calculates the torque input values through Expression 1 using the control gains and the variables determining the target joint routes, which are set as optimization variables.

The control unit 410 selects plural poses from among continuous poses assumed by the robot during walking of the robot in a half cycle in which the robot makes one step with its one foot to determine the target joint routes, and sets the selected plural poses as reference poses. In this embodiment, the reference poses include a pose when the walking of the robot in the half cycle is started, a pose when the walking of the robot in the half cycle is completed, and a pose halfway between the point of time when the walking of the robot in the half cycle is started and the point of time when the walking of the robot in the half cycle is completed.

The control unit 410 calculates angles of the torso joint, the hip joints, the knee joints, and the ankle joints in the directions of the corresponding degrees of freedom in the respective reference poses, and determines routes of the respective target joints of the robot during walking of the robot in the half cycle through spline interpolation of the calculated angles.

Figure 6:
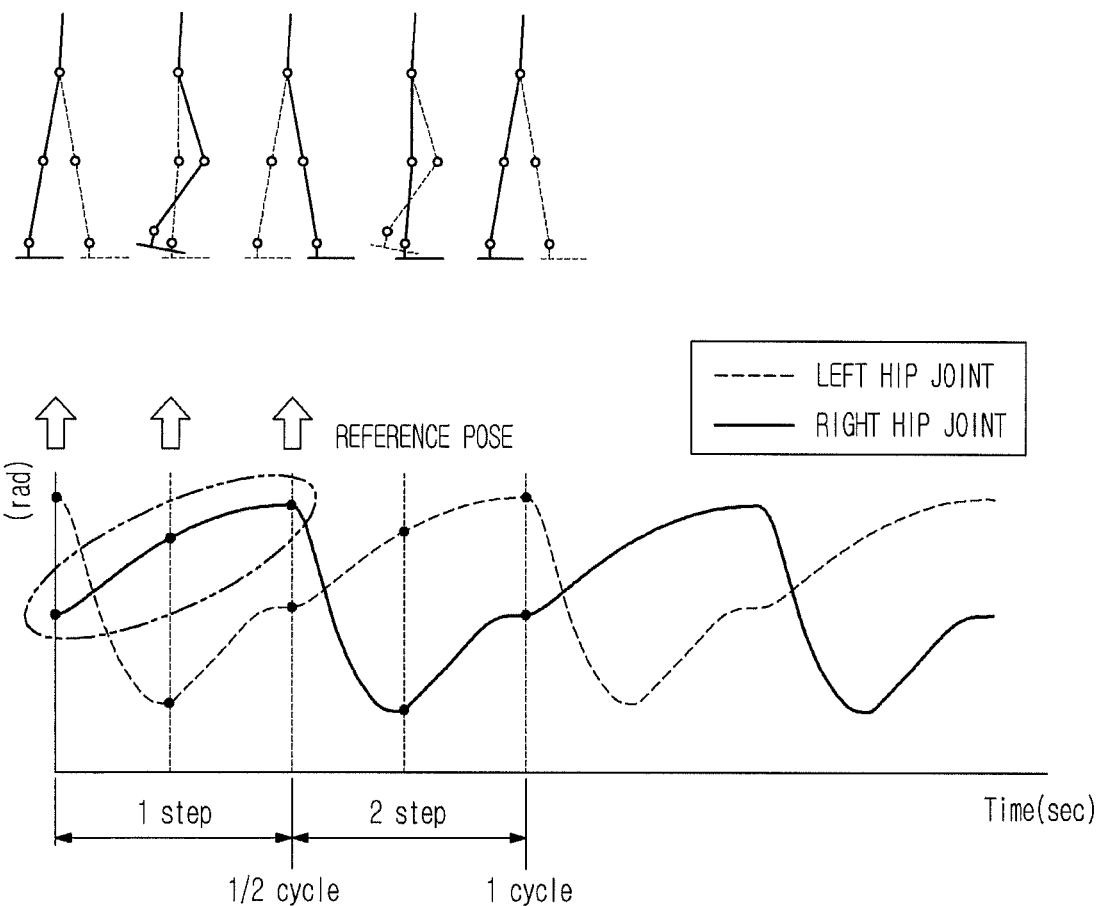
FIG. 6 is a graph illustrating routes of hip joints of the robot in accordance with an embodiment.

FIG. 6 is a graph illustrating routes of the hip joints among the target joints of the robot in accordance with an embodiment. Angle variations of the hip joints in the y-axis direction in each of the respective reference poses are calculated, and routes of the hip joints of the robot during walking of the robot in the half cycle (indicated by a circle in FIG. 6) are generated through spline interpolation of the calculated angle variations. A solid line indicates the route of the right hip joint, and a dotted line indicates the route of the left hip joint. When the routes during walking of the robot in the half cycle are determined in such a manner, routes during walking of the robot in the remaining walking period may be determined using periodicity in walking and symmetry in leg swing, as shown in FIG. 6.

The control unit 410 sets an objective function J consisting of the sum total of various performance indices to allow the robot to perform natural walking similar to a human with high energy efficiency.

$$J = w_1 J_1 + w_2 J_2 + w_3 J_3 + w_4 J_4 + w_5 J_5 \quad \text{[Expression 2]}$$

$$J_1 = \sum_{i=1}^{n} \|x_i - x_i^d\|^2 \quad \text{[Expression 3]}$$

$$J_2 = \sum_{i=1}^{n} \|F_i\|^2 +$$

$$\sum_{i=3}^{n-3} (\|F_{i-2} - F_{i+1}\|^2 + \|F_i - F_{i+1}\|^2 + \|F_i - F_{i+3}\|^2)$$

$$J_3 = \|v - v^d\|^2$$

$$J_4 = \sum_{i=0}^{t_f} \|\tau_i(t)\|^2$$

$$J_5 = (P - P_{pred})^T W (P - P_{pred})$$

Expression 2 represents the objective function J consisting of the sum total of plural performance indices J1~J5 relating to walking of the robot. Coefficients preceding the performance indices mean weights assigned to apply importance to the respective performance indices.

The control unit 410 checks whether or not a value of the objective function J satisfies a convergence condition (i.e., a predetermined condition). The convergence condition is satisfied if a difference between the current value of the objective function and a value of the objective function calculated in the previous process is less than a designated value. Here, the designated value may be predetermined by a user. The control unit 410 makes the value of the objective function to satisfy the convergence condition, thereby allowing the robot to perform natural walking similar to a human with high energy efficiency.

Expression 3 represents numerical formulas of the respective performance indices of the objective function.

$J_1$ is a performance index indicating a position error of a foot of the robot contacting the ground, x represents an actual position of the foot contacting the ground, and $x_d$ represents an objective position of the foot contacting the ground. i represents the step count. $J_1$ is a difference between the actual position and the objective position of the foot, and thus represents the position error of the foot.

In $J_2$, F represents force applied to the foot of the robot when the foot of the robot contacts the ground. The first term in $J_2$ represents force applied to the foot of the robot when the foot of the robot contacts the ground, and the second term represents a difference of forces applied to the feet of the robot at respective steps. No difference of forces means that walking of the robot is periodically achieved, and thus $J_2$ is a performance index indicating a force error applied to the foot of the robot when the foot of the robot contacts the ground and a periodicity error of walking of the robot.

v in $J_3$ represents an actual walking velocity of the robot, and $v^d$ represent an objective walking velocity of the robot. Therefore, $J_3$ is a performance index indicating a walking velocity error of the robot.

$\tau$ in $J_4$ represents a torque of each of the respective joints required for walking of the robot, and $t_f$ represents time to complete planed walking. Therefore, $J_4$ is a performance index indicating torques required during walking of the robot.

P in $J_5$ represents a vector consisting of a variable to determine an actual target joint route, and $P_{pred}$ represents a vector consisting of a variable to determine an objective target joint route. T is a mark representing transposition of the vector, W represents a diagonal matrix in which the number of elements of the vector P is expressed in rows and columns, and respective diagonal elements serve as weights to the respective elements of the vector. Therefore, $J_5$ is a performance index indicating a walking style error.

Although this embodiment illustrates the objective function as consisting of five performance indices, the configuration of the objective function is not limited thereto. Further, the performance indices are not limited to the above-described contents and may include other limitations relating to walking of the robot.

The control unit 410 obtains a resultant motion of the robot through calculation of forward dynamics using the torque input values, and calculates the value of the objective function using data of the resultant motion and actual walking of the robot. If the calculated value of the objective function does not satisfy the convergence condition, the control unit 410 adjusts optimization variables several times so that the value of the objective function satisfies the convergence condition.

Figure 7:
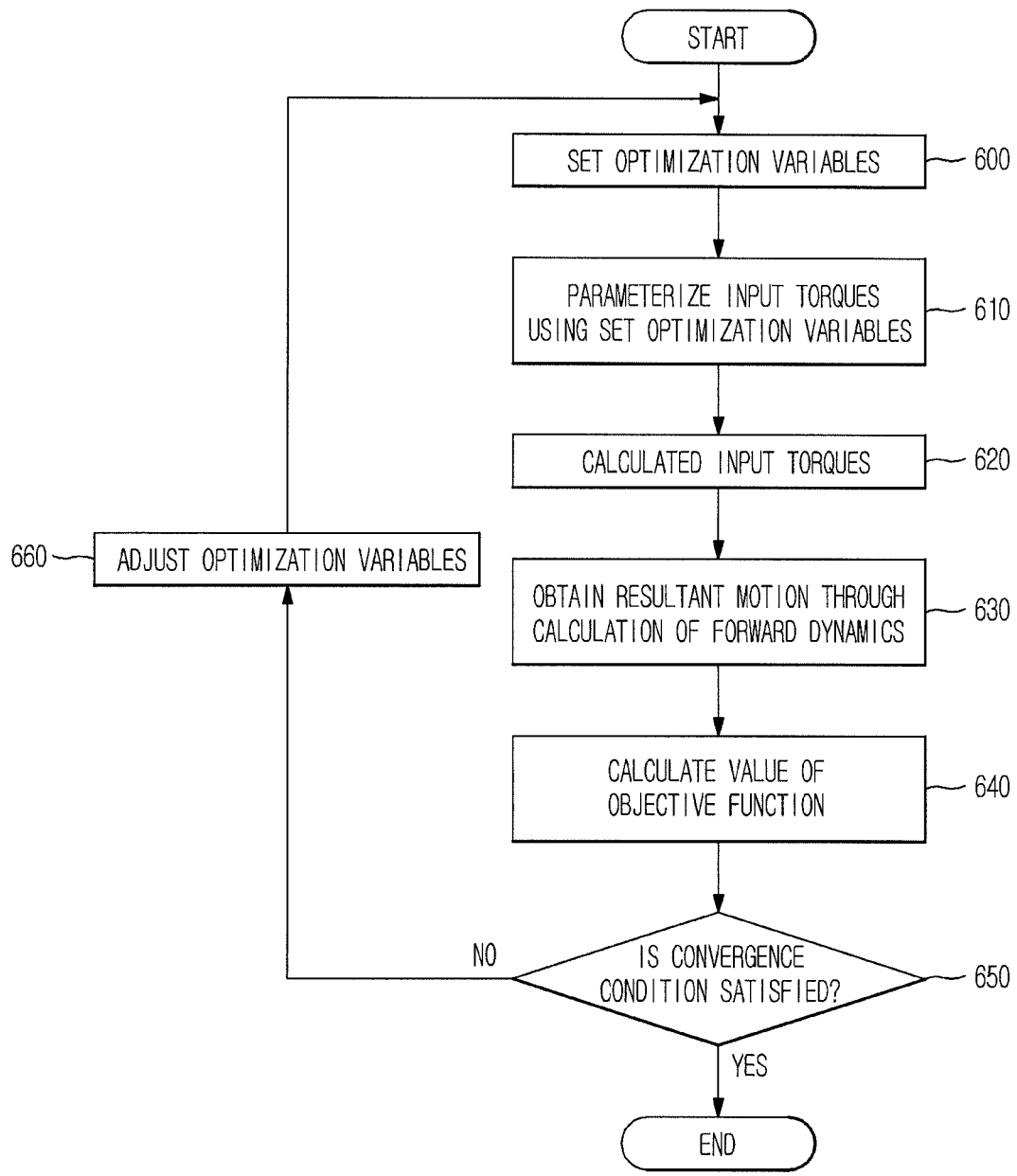
FIG. 7 is a flow chart illustrating a walking control method of a robot in accordance with an embodiment.

FIG. 7 is a flow chart illustrating a walking control method of a robot in accordance with an embodiment.

As shown in FIG. 7, the control unit 410 sets control gains and plural variables to determine routes of target joints to be controlled during walking of the robot as optimization variables (operation 600). The control unit 410 may set the minimum number of control variables to determine the target joint routes using periodicity in walking and symmetry in leg swing.

Thereafter, the control unit 410 calculates torque input values by parameterizing Expression to calculate the torque input values using the set optimization variables (operation 610 and operation 620). Expression 1 below is used as the expression to calculate the torque input values.

$$\tau^i = k_p^i (q_d^i - q^i) - k_d^1 \bar{q}^i \quad \text{[Expression 1]}$$

Thereafter, the control unit 410 obtains a resultant motion of the robot through calculation of forward dynamics using the calculated torque input values (operation 630).

Thereafter, the control unit 410 sets an objective function consisting of the sum total of various performance indices to allow the robot to perform natural walking similar to a human with high energy efficiency, and then calculates the value of the objective function using data of the resultant motion and actual walking of the robot (operation 640). The objective function is given by Expression 2 below.

$$J = w_1 J_1 + w_2 J_2 + w_3 J_3 + w_4 J_4 + w_5 J_5 \quad \text{[Expression 2]}$$

Thereafter, the control unit 410 judges whether or not the value of the objective function satisfies the convergence condition (operation 650). The convergence condition is satisfied if a difference between the value of the objective function and a value of the objective function calculated in the previous process is less than a designated value.

Thereafter, when the value of the objective function does not satisfy the convergence condition, the control unit 410 adjusts the optimization variables and repeats the above-described process until the value of the objective function satisfies the convergence condition (operation 660).

According to various embodiments, the optimization variables are adjusted to so that the value of the objective function satisfies a predetermined condition. As an example, in an embodiment, the optimization variables may be controlled to minimize the value of the objective function, and thereby satisfy a predetermined condition. For example, according to an embodiment, optimization variables may be controlled to minimize the value of the objective function to thereby satisfy a convergence condition. However, embodiments are not limited to minimizing the value of the objective function. Instead, in some embodiments, the optimization variable can be adjusted so that the value of the object function simply, achieves a predetermined condition which is not a minimization of the value of the objective function.

According to various embodiments, a robot is controlled in accordance with the adjusted variables.

As is apparent from the above description, a robot and a control method thereof in accordance with an embodiment automatize optimization of actuated dynamic walking and thus allow the robot to perform natural walking similar to a human with high energy efficiency.

The embodiments can be implemented in computing hardware and/or software, such as (in a non-limiting example) any computer that can store, retrieve, process and/or output data and/or communicate with other computers. For example, calculations and operations described herein may be performed by a computer. For example, control unit 410, or various of the other units, in FIG. 4, may include a computer, or a computer processor, for performing calculations and/or operations. A program/software implementing the embodiments and executed by computer may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A walking control method of a robot comprising:
    setting a plurality of variables to determine target joint routes and control gains as control variables;
    calculating, by a computer, torque input values based on the control variables;
    obtaining a resultant motion through calculation of forward dynamics using the calculated torque input values;
    setting an objective function consisting of the sum total of a plurality of performance indices; and
    adjusting, by a computer, the control variables so that a value, calculated using the obtained resultant motion, of the objective function satisfies a predetermined condition.

2. The walking control method according to claim 1, wherein the plurality of variables to determine the target joint routes include a variable indicating left and right movement of hip joints of the robot, a variable indicating an inclination of a torso of the robot, a variable indicating a length of a stride of the robot, a variable indicating a bending angle of knees of the robot, a variable indicating a walking velocity of the robot, a variable indicating movement of ankles of the robot in the y-axis direction, a variable indicating an initial state of the left and right movement of the hip joints of the robot, and a variable indicating an initial state of the stride of the robot.

3. The walking control method according to claim 1, wherein the control gains include a position gain and a damping gain.

4. The walking control method according to claim 1, wherein the target joint routes are determined by setting a plurality of poses, selected from among poses assumed by the robot during walking of the robot in a half cycle, as reference poses and carrying out interpolation of angles of respective joints of the robot in the plurality of reference poses.

5. The walking control method according to claim 4, wherein the walking of the robot in the half cycle means that the robot makes one step with its one foot.

6. The walking control method according to claim 4, wherein the target joint routes are overall routes of the respective joints obtained through symmetry in swing of left and right feet of the robot and periodicity in walking of the robot based on target joint routes of the respective joints determined during walking of the robot in the half cycle.

7. The walking control method according to claim 4, wherein the reference poses include a pose when the walking of the robot in the half cycle is started, a pose when the walking of the robot in the half cycle is completed, and a pose halfway between the point of time when the walking of the robot in the half cycle is started and the point of time when the walking of the robot in the half cycle is completed.

8. The walking control method according to claim 4, wherein the joints include a torso joint, hip joints, knee joints, and ankle joints.

9. The walking control method according to claim 1, wherein, in the setting of the objective function, the objective function consists of the sum total of a performance index indicating a position error of a foot of the robot contacting the ground, a performance index indicating a force error transmitted to the foot of the robot at the point of time when the foot of the robot contacts the ground and a periodicity error of walking of the robot, a performance index indicating a walking velocity error of the robot, a performance index to minimize torques required during walking of the robot, and a performance index to minimize a walking style error generated when a current walking style is compared with a predetermined walking style.

10. The walking control method according to claim 1, wherein said adjusting adjusts the control variables to minimize the value of the objective function, and thereby satisfy the predetermined condition.

11. A robot comprising:
    an input unit to which a walking command of the robot is input; and
    a control unit to control walking of the robot in accordance with a walking command input to the input unit by
    calculating torque input values through control variables,
    obtaining a resultant motion of the robot through calculation of forward dynamics using the calculated torque input values, and
    adjusting the control variables so that a value, calculated using the obtained resultant motion, of an objective function, set to consist of the sum total of a plurality of performance indices, satisfies a predetermined condition.

12. The robot according to claim 11, wherein the control variables include a plurality of variables to determine target joint routes of the robot and control gains.

13. The robot according to claim 12, wherein the plurality of variables to determine the target joint routes include a variable indicating left and right movement of hip joints of the robot, a variable indicating an inclination of a torso of the robot, a variable indicating a length of a stride of the robot, a variable indicating a bending angle of knees of the robot, a variable indicating a walking velocity of the robot, a variable indicating movement of ankles of the robot in the y-axis direction, a variable indicating an initial state of the left and right movement of the hip joints of the robot, and a variable indicating an initial state of the stride of the robot.

14. The robot according to claim 12, wherein the control gains include a position gain and a damping gain.

15. The robot according to claim 12, wherein the target joint routes are determined by setting a plurality of poses, selected from among poses assumed by the robot during walking of the robot in a half cycle, as reference poses and carrying out interpolation of angles of respective joints of the robot in the plurality of reference poses.

16. The robot according to claim 15, wherein the walking of the robot in the half cycle means that the robot makes one step with its one foot.

17. The robot according to claim 15, wherein the target joint routes are overall routes of the respective joints obtained through symmetry in swing of left and right feet of the robot and periodicity in walking of the robot based on target joint routes of the respective joints determined during walking of the robot in the half cycle.

18. The robot according to claim 15, wherein the reference poses include a pose when the walking of the robot in the half cycle is started, a pose when the walking of the robot in the half cycle is completed, and a pose halfway between the point of time when the walking of the robot in the half cycle is started and the point of time when the walking of the robot in the half cycle is completed.

19. The robot according to claim 15, wherein the joints include a torso joint, hip joints, knee joints, and ankle joints.

20. The robot according to claim 11, wherein the objective function consists of the sum total of a performance index indicating a position error of a foot of the robot contacting the ground, a performance index indicating a force error transmitted to the foot of the robot at the point of time when the foot of the robot contacts the ground and a periodicity error of walking of the robot, a performance index indicating a walking velocity error of the robot, a performance index to minimize torques required during walking of the robot, and a performance index to minimize a walking style error generated when a current walking style is compared with a predetermined walking style.

21. The robot according to claim 11, wherein the control unit adjusts the control variables to minimize the value of the objective function, and thereby satisfy the predetermined condition.

22. A method comprising:
adjusting, by a computer, variables used to determine at least one of target joint routes and control gains of a walking robot so that a value, calculated using a resultant motion of the robot obtained through calculation of forward dynamics of the robot, of an objective function including of a plurality of performance indices satisfies a predetermined condition; and
controlling, by a computer, the robot in accordance with the adjusted variables.

23. The method according to claim 22, wherein said adjusting adjusts the variables to minimize the value of the objective function, and thereby satisfy the predetermined condition.

* * * * *